US008677381B2

(12) United States Patent  
Kawakami

(10) Patent No.: US 8,677,381 B2  
(45) Date of Patent: Mar. 18, 2014

(54) OPTICAL DISC PROCESSING DEVICE AND OPTICAL DRIVE INSTALLATION DEVICE

(75) Inventor: Hideki Kawakami, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 13/472,846

(22) Filed: May 16, 2012

(65) Prior Publication Data

US 2012/0331493 A1 Dec. 27, 2012

(30) Foreign Application Priority Data

Jun. 24, 2011 (JP) ................................. 2011-140624

(51) Int. Cl.  
*G11B 33/12* (2006.01)  
*G11B 15/68* (2006.01)

(52) U.S. Cl.  
USPC ................. 720/657; 361/679.37; 361/679.38; 361/679.39; 361/679.43; 361/679.58; 360/92.1

(58) Field of Classification Search  
USPC ........ 720/652, 654, 657; 361/679.37, 679.38, 361/679.39, 679.43, 679.58; 360/92.1  
See application file for complete search history.

(56) References Cited

U.S. PATENT DOCUMENTS 5,305,180 A * 4/1994 Mitchell et al. .......... 361/679.37  
5,310,358 A * 5/1994 Johnson et al. ............... 439/358  
5,587,854 A * 12/1996 Sato et al. .................. 360/97.11  
5,926,341 A * 7/1999 Mueller et al. ............... 360/92.1  
5,947,572 A * 9/1999 Chang ......................... 312/332.1  
6,201,781 B1 3/2001 Abe  
7,636,237 B2 * 12/2009 Cheung et al. ............ 361/679.37  
7,733,643 B1 * 6/2010 Rumpf ..................... 361/679.43  
8,264,824 B2 * 9/2012 Makley et al. ........... 361/679.01  
8,369,079 B2 * 2/2013 Collins ..................... 361/679.37  
2008/0089022 A1* 4/2008 Cheung et al. ................ 361/685

FOREIGN PATENT DOCUMENTS

| JP | 10177760 A | * | 6/1998 |
| JP | 2000048445 A | | 2/2000 |
| JP | 2002108499 A | | 4/2002 |
| JP | 2002269966 A | | 9/2002 |
| JP | 2007247390 A | * | 9/2007 |
| JP | 2009181636 A | | 8/2009 |

* cited by examiner

*Primary Examiner* — Will J Klimowicz  
(74) *Attorney, Agent, or Firm* — Lowe Hauptman & Ham LLP

(57) ABSTRACT

An optical drive installation device including: a support frame that disposes a removable optical drive to an installation position; a lock mechanism that has a locking member which can move to a locked position preventing the optical drive from being removed or an unlocked position not interfering with the optical drive being removed, and supports the optical drive at the installation position of the support frame when the locking member is set to the locked position; an unlocking mechanism that releases the lock mechanism from the locked position; and a pushing member that pushes the optical drive in the direction in which the optical drive is removed from the installation position.

12 Claims, 7 Drawing Sheets

OPTICAL DISC PROCESSING DEVICE AND OPTICAL DRIVE INSTALLATION DEVICE

BACKGROUND

1. Technical Field

The present invention relates to an optical disc processing device that has an optical drive for writing data to a CD, DVD, or other type of optical disc, and to an optical drive installation device.

2. Related Art

CD, DVD, and other types of optical discs are commonly used as media for recording large amounts of data. Disc publishers having an optical drive for recording and playing data, and a printer for printing on the label side of the optical discs, are also used to write data to optical discs and produce finished CD or DVD discs. Such publishers have a disc tray that can move in and out of the optical drive, and a disc transportation mechanism such as a conveyance arm that carries the optical discs to the disc tray, and control the optical drive and disc transportation mechanism to supply optical discs to the optical drive and remove the optical discs.

Installing an optical drive into a publisher or other apparatus usually involves first attaching the optical drive to a support frame, and then positioning and fastening the support frame in the apparatus. Using this installation method requires removing the support frame and optical drive assembly from the apparatus in order to replace an optical drive, installing the new optical drive to the support frame, and then reinstalling and fastening the support frame and optical drive assembly in the apparatus. This method makes drive installation more difficult for the installer, and complicates accurately positioning the optical drive.

In order to dependably transfer discs to and from the optical drive and improve the reliability of disc transportation, the installation position of the optical drive must be accurately adjusted so that the conveyance position of the optical disc by the transportation mechanism matches the position of the disc tray. To enable this, providing a positioning mechanism for precisely adjusting the installation position of the optical drive in the publisher has been proposed. A disc publisher of this type is taught in Japanese Unexamined Patent Appl. Pub. JP-A-2009-181636.

The publisher taught in JP-A-2009-181636 is configured so that the optical drive can be inserted from the front to the support frame that supports the optical drive (media drive), moved appropriately in the front-back direction to precisely adjust the installation position, and then fastened in the appropriate position. A torsion spring for pushing the optical drive to the back is disposed at the front end part of either the left or right side of the optical drive. A position adjustment screw that can be screwed in or out in the front-back direction is provided in the rear end part of the same side as the torsion spring.

The optical drive is positioned in JP-A-2009-181636 by turning the position adjustment screw from the back of the support frame so that the optical drive moves forward in resistance to the force of the torsion spring. A long guide hole extending in the front-back direction is formed in the support frame of the apparatus, and when the optical drive moves in the front-back direction, this guide hole and a set screw hole formed on the optical drive side overlap and move relative to each other. After position adjustment is completed, the optical drive is fixed to the support frame by tightening the set screw through the guide hole into the set screw hole.

While the configuration taught in JP-A-2009-181636 enables precisely adjusting the installation position of the optical drive, no particular means of confirming positioning of the optical drive to the specified installation position, or means of confirming that the drive was accurately installed to the specified installation position, is provided. Confirming that the drive is correctly positioned to the specified installation position and that installation was completed is therefore difficult, and installation is time-consuming.

In addition, while the configuration taught in JP-A-2009-181636 enables removably installing the optical drive, replacing the optical drive requires manipulating a set screw and position adjustment screw from the back and side of the support frame. As a result, the optical drive must be removed together with the support frame, or the outside case of the apparatus must be removed in order to access the back and side. Replacing the optical drive is therefore difficult and not user-friendly.

SUMMARY

To improve the reliability of media conveyance and make replacing an optical drive easier in a disc publisher or other optical disc processing device, an optical drive installation mechanism according to the invention enables accurately and easily replacing an optical drive, and an optical disc processing device according to the invention has the optical drive installation mechanism.

One aspect of the invention is an optical drive installation device having a support frame that disposes a removable optical drive to an installation position; a lock mechanism that has a locking member which can move to a locked position preventing the optical drive from being removed or an unlocked position not interfering with the optical drive being removed, and supports the optical drive at the installation position of the support frame when the locking member is set to the locked position; an unlocking mechanism that releases the lock mechanism from the locked position; and a pushing member that pushes the optical drive in the direction in which the optical drive is removed from the installation position.

Preferably, the lock mechanism has an engaging part that engages the locking member; the engaging part is disposed to the optical drive or the support frame; and the locking member is disposed to whichever of the optical drive or the support frame the engaging part is not disposed.

Further preferably, the optical drive installation device also has a locking member pushing member that pushes the locking member toward the locked position; wherein the locking member retracts from the locked position in conjunction with an operation installing the optical drive to the installation position, and when the optical drive is installed to the installation position, moves to the locked position by the pressure of the locking member pushing member.

When the optical drive is inserted to the installation position, the force of the locking member pushing member of the invention pushes the locking member to the locked position, the lock is engaged, and the optical drive cannot be pulled out. Installing the optical drive is completed with the invention by simply inserting the optical drive along the support frame in the specified insertion direction, and does not require any difficult tasks such as fastening the optical drive to the support frame with a screw. Inserting the optical drive from one direction to the support frame is also sufficient, and there is no need to remove an outside cover covering the back of the support frame, for example. Installing an optical drive can therefore be easily completed.

Furthermore, because the invention has a pushing member that pushes the optical drive in the removal direction, the pressure from the pushing member can reliably position the optical drive in the specified installation position when the lock is engaged after installation is completed. Optical discs can therefore be reliably transferred between the optical drive and the conveyance mechanism, and the reliability of optical disc conveyance is improved. When the optical drive has not been inserted to the installation position, the lock is not engaged, and the optical drive is pushed out in the removal direction by the force of the pushing member. Whether installation to the installation position was completed can therefore be confirmed at a glance. The optical drive is also automatically pushed out in the removal direction when the lock is disengaged by the unlocking mechanism. Removal is therefore simple.

In another aspect of the invention, the engaging part is preferably a locking pin disposed to the optical drive; the locking member is a locking lever supported freely pivotably on the support frame; and when installing the optical drive, the locking member pushing member pushes the locking lever in the direction pivoting from the unlocked position where the locking pin is retracted from the path of movement to the locked position where the locking pin is in the path of movement.

Further preferably, the locking lever is pushed by the locking pin and pivots to the unlocked position side when installing the optical drive, and moves to the locked position when the optical drive is set to the installation position.

Using a simple construction, this aspect of the invention can move the locking lever from the locked position by means of the locking pin while the optical drive is inserted, and can engage the lock when the optical drive reaches the installation position.

In this case, the unlocking mechanism includes a guide hole formed in the locking lever, and an unlocking lever having an unlocking pin that is engaged in the guide hole, and when the unlocking lever is operated, causes the locking lever to rotate to the unlocked position side.

This enables easily releasing the optical drive from the locked position by pulling the unlocking lever. The optical drive can also be easily removed because the pushing member pushes the optical drive out after the lock is disengaged.

Further preferably, the locking pin is disposed to one side of the optical drive; the locking lever is disposed to a part of the support frame opposite the one side; and the support frame has disposed to a part of the support frame opposite the other side of the optical drive a protruding part that contacts the other side of the optical drive.

By thus disposing a construction that locks the optical drive on only one side, a small, simply lock mechanism can be used. In addition, because a lock mechanism is not disposed to the other side, the pressure of the pushing member works to make the optical drive rotate around the lock position. Because a protruding part is disposed on the side where the lock mechanism is not disposed, and this part contacts the optical drive and positions the optical drive in the widthwise direction, the optical drive can be prevented from turning when the position where the pushing member applies pressure and the lock position are offset in the widthwise direction of the optical drive and torque acts on the optical drive.

Further preferably in another aspect of the invention, the support frame supports a plurality of optical drives stacked one above the other, provides each optical drive with the foregoing lock mechanism and unlocking mechanism, and locates the lock mechanisms and unlocking mechanisms so that they do not block the heat ventilation space provided between each optical drive and another optical drive located thereabove or therebelow. This configuration is advantageous for cooling the optical drives, and can suppress overheating of the optical drives.

Further preferably in an optical drive installation device according to another aspect of the invention, a support member supports the optical drive; the engaging part is formed in the support member, and includes a first engaging channel formed in a second direction intersecting a first direction in which the optical drive is installed, and a second engaging channel that is formed in the first direction and is connected to the first engaging channel; and the locking member is a slide panel that is supported by the support frame, has a slide pin that engages the first engaging channel and second engaging channel, and slides in the second direction.

When installing the optical drive, the slide pin moves through the second engaging channel to the junction between the first engaging channel and second engaging channel, and when the optical drive is set to the installation position, the slide pin moves into the first engaging channel due to the pressure from the locking member pushing member, and the optical drive can be held in the locked position.

This configuration enables inserting the optical drive guided by the second engaging channel, limits movement of the slide panel in the locking direction while the optical drive is being inserted, and keeps the lock mechanism disengaged. When the optical drive reaches the installation position, the lock is then automatically engaged.

Another aspect of the invention is an optical disc processing device including: a removably installed optical drive that processes an optical disc; and an optical drive installation unit including a support frame that disposes the optical drive to an installation position, a lock mechanism that has a locking member which can move to a locked position preventing the optical drive from being removed or an unlocked position not interfering with the optical drive being removed, and supports the optical drive at the installation position of the support frame when the locking member is set to the locked position, an unlocking mechanism that releases the lock mechanism from the locked position, and a pushing member that pushes the optical drive in the direction in which the optical drive is removed from the installation position.

Preferably, the lock mechanism has an engaging part that engages the locking member; the engaging part is disposed to the optical drive or the support frame; and the locking member is disposed to whichever of the optical drive or the support frame the engaging part is not disposed.

Further preferably, the optical disc processing device also has a locking member pushing member that pushes the locking member toward the locked position; and the locking member retracts from the locked position in conjunction with an operation installing the optical drive to the installation position, and when the optical drive is installed to the installation position, moves to the locked position by the pressure of the locking member pushing member.

With this aspect of the invention, installing the optical drive is completed by simply inserting the optical drive in the specified insertion direction, and does not require any difficult tasks such as fastening the optical drive to the support frame with a screw. There is no need to remove an outside cover covering the back of the support frame, for example. Installing an optical drive can therefore be easily completed.

Furthermore, because the optical drive is pushed in the removal direction by the invention, the optical drive can be reliably positioned to the specified installation position by this pressure when installation is completed and the lock is engaged. Optical discs can therefore be reliably transferred between the optical drive and the conveyance mechanism, and the reliability of optical disc conveyance is improved. When the optical drive has not been inserted to the installation position, the lock is not engaged, and the optical drive is pushed out in the removal direction. Whether installation to the specified position was completed can therefore be confirmed at a glance. The optical drive can also be easily pulled out because the optical drive is automatically pushed out in the removal direction when the lock is disengaged by the unlocking mechanism. Removal is therefore simple.

DESCRIPTION OF EMBODIMENTS

Preferred embodiments of a disc publisher and optical drive installation mechanism according to the present invention are described below with reference to the accompanying figures.

General Configuration

Figure 1:
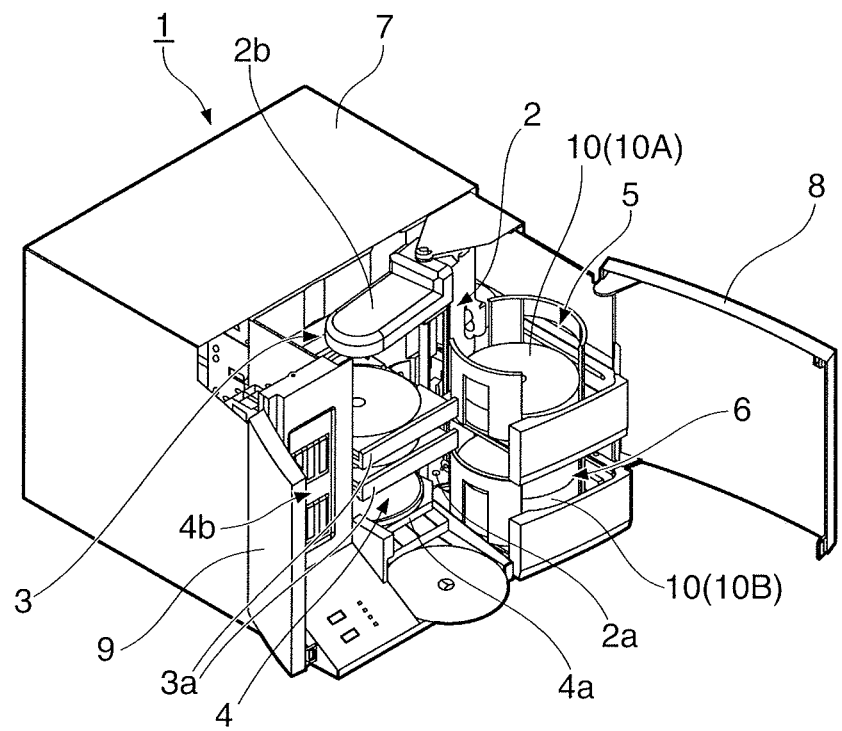
FIG. 1 is an oblique view of a disc publisher according to the invention from the front.

FIG. 1 is an oblique view from the front of a disc publisher according to the invention with the front doors of the case 7 open and part of the top panel of the case 7 removed. The disc publisher 1 (optical disc processing device) consecutively writes data and prints a label on optical discs 10 such as CD or DVD media, and has an automatic loader 2 (conveyance mechanism) for conveying the optical discs 10, an optical drive 3 that writes data to the optical discs 10, and a label printer 4 for printing on the label side of the optical discs 10. The disc publisher 1 also has a supply stacker 5 that stores blank discs 10A to be supplied to the optical drive 3, and a storage stacker 6 that stores the completed discs 10B to which writing data and label printing have been completed.

More specifically, the disc publisher 1 has a box-like case 7, and access doors 8, 9 that open and close to the right and left are attached at the front of the case 7. The supply stacker 5 and storage stacker 6 are disposed inside the case 7 one above the other inside the access door 8, which is located on the right side as seen from the front. The stackers 5, 6 store the optical discs 10 (blank discs 10A, completed discs 10B) in vertical stacks. The stackers 5, 6 can be pulled forward and out by opening the access door 8. Blank discs 10A can be supplied or loaded into the supply stacker 5 when the supply stacker 5 is pulled out, and when the storage stacker 6 is pulled out, the completed discs 10B can be removed therefrom.

The automatic loader 2 (conveyance mechanism) is located behind the supply stacker 5 and storage stacker 6. The automatic loader 2 has a guide shaft 2a and a disc carrier 2b attached to the vertical guide shaft 2a. The disc carrier 2b can move up and down along the guide shaft 2a, and can pivot on the guide shaft 2a. A gripping means not shown for gripping and holding an optical disc 10 using a hole formed in the center of the optical disc 10 is disposed at the distal end of the disc carrier 2b. Using combinations of the vertical movement and pivoting movement of the disc carrier 2b, the automatic loader 2 carries the optical discs 10 between the optical drive 3, label printer 4, supply stacker 5, and storage stacker 6.

Two optical drives 3 are disposed one above the other inside the case 7 at a position behind the center of the front, and the label printer 4 is disposed therebelow. An ink cartridge holder 4b is located inside the case 7 on the inside of the access door 9 located on the left side when seen from the front. An ink cartridge for supplying ink to the label printer 4 is installed in the ink cartridge holder 4b.

FIG. 1 shows the disc trays 3a of the optical drive 3 and the disc tray 4a of the label printer 4 when moved to the outside position. These positions of the disc trays 3a, 4a are the disc transfer positions where optical discs 10 are transferred between the optical drive 3 and label printer 4 and the automatic loader 2. The disc trays 3a of the optical drives 3 can move between a data writing position inside the optical drives 3, and the transfer position shown in FIG. 1. The disc tray 4a of the label printer 4 can likewise move between the printing position inside the printer and the transfer position shown in FIG. 1.

Optical Drive Installation Mechanism

Embodiment 1

Figure 2:
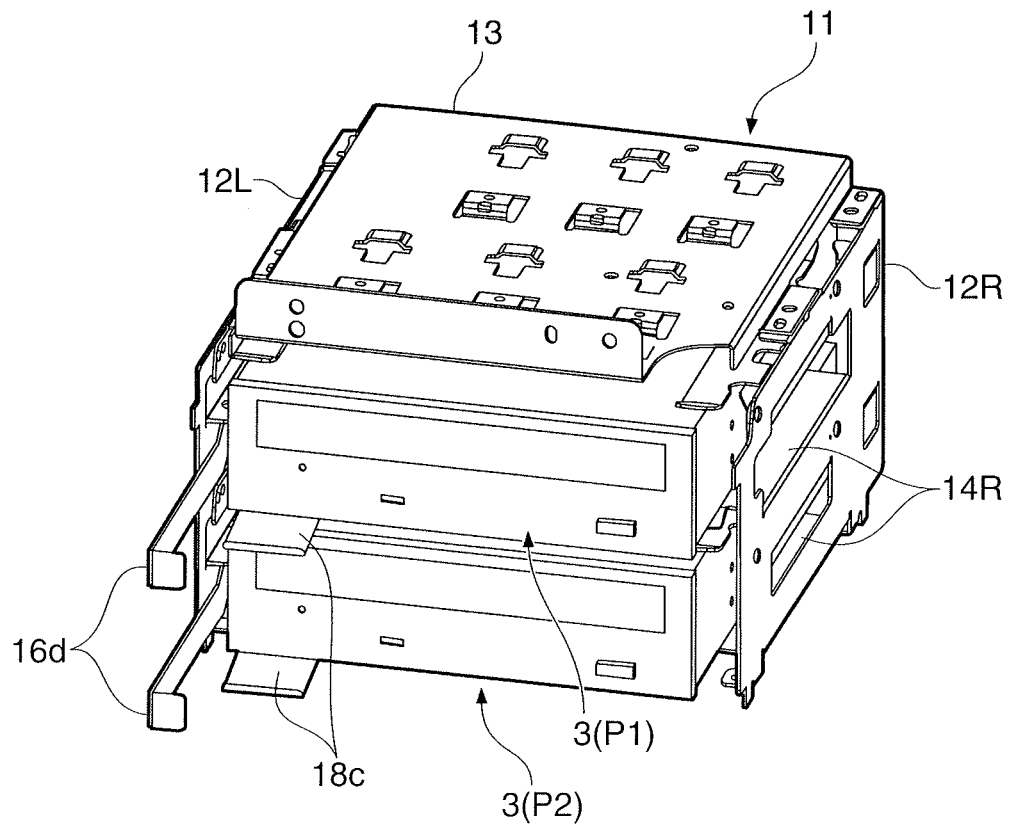
FIG. 2 is an oblique view of an optical drive and support frame therefor.
Figure 3:
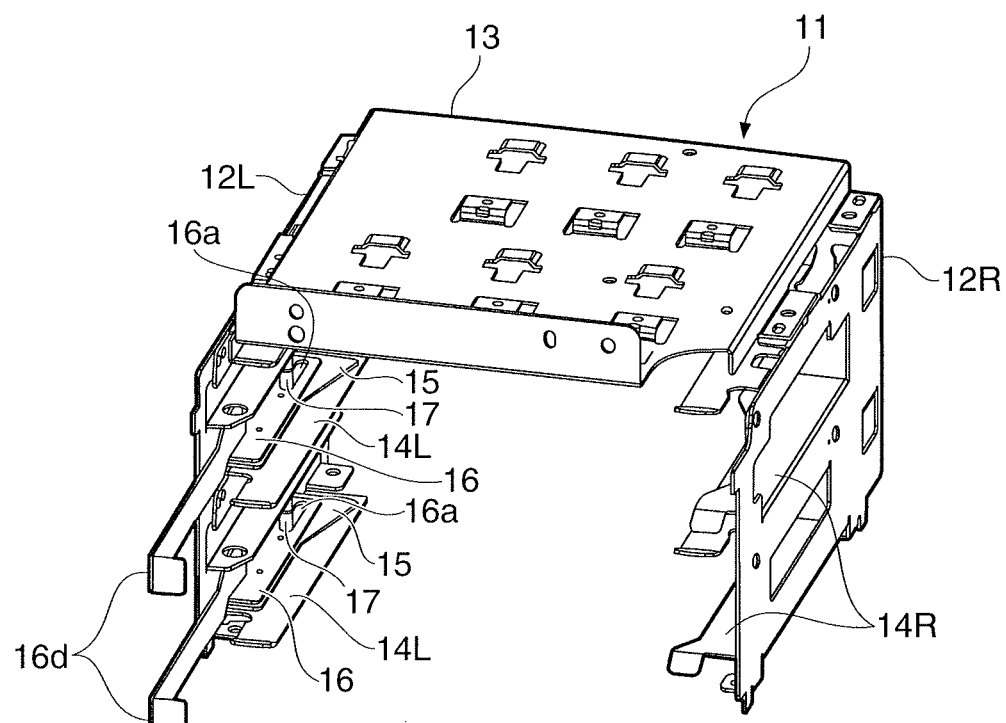
FIG. 3 is an oblique view of the support frame.

FIG. 2 is an oblique view of the optical drive 3 and support frame 11, and FIG. 3 is an oblique view of the support frame 11. As shown in FIG. 2, the optical drives 3 are held by the support frame 11 covering the top and sides. The support frame 11 is fastened to the top of the label printer 4 inside the case 7. The optical drives 3 are supported by this support frame 11 in installation position P1 or installation position P2. The optical drives 3 are inserted from the front of the support frame 11 to installation positions P1 and P2.

Figure 5:
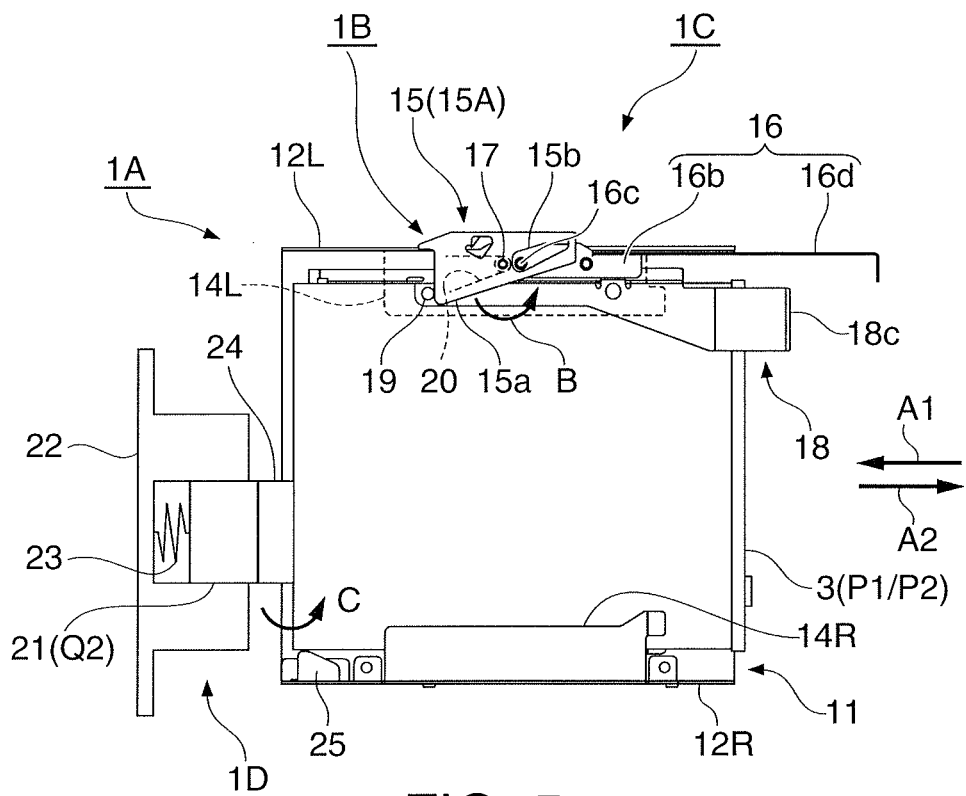
FIG. 5 is a bottom view of the optical drive installation mechanism (when locked) according to the first embodiment of the invention.
Figure 6:
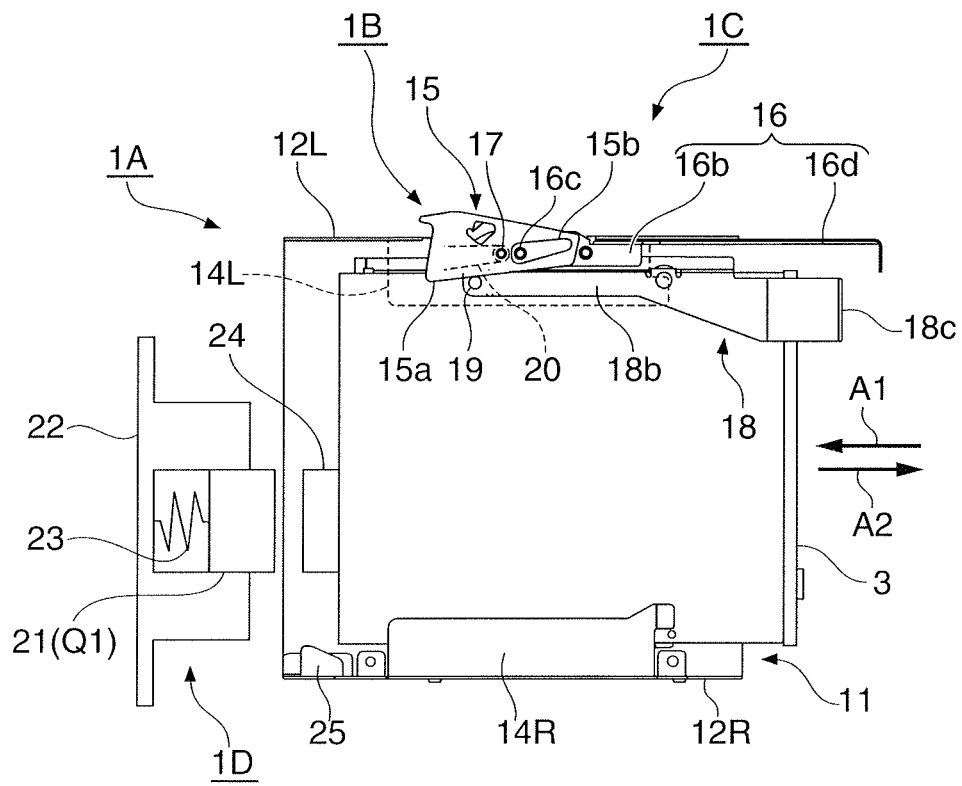
FIG. 6 is a bottom view of the optical drive installation mechanism (when the optical drive is partially inserted) according to the first embodiment of the invention.
Figure 8:
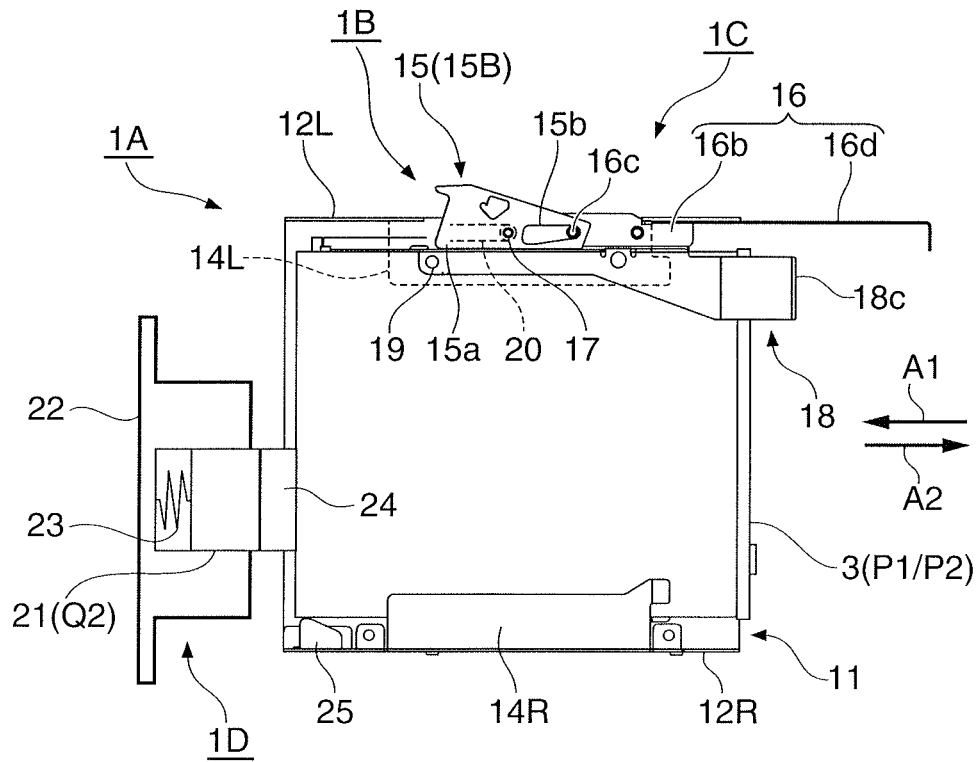
FIG. 8 is a bottom view of the optical drive installation mechanism (when the lock is released) according to the first embodiment of the invention.

The disc publisher 1 has an optical drive installation mechanism 1A (see FIGS. 5, 6, and 8) enabling removably installing a optical drive 3 to installation position P1 or P2. The optical drive installation mechanism 1A includes the above support frame 11, a lock mechanism 1B (FIGS. 5, 6, and 8) for preventing pulling the optical drives 3 from installation positions P1 and P2, and an unlocking mechanism 1C (FIGS. 5, 6, and 8) for disengaging the lock mechanism 1B from the locked position. The optical drive installation mechanism 1A also has connector connecting mechanisms 1D (pressure member; FIGS. 5, 6, and 8) located behind the optical drives 3.

As shown in FIG. 2 and FIG. 3, the support frame 11 has left and right side panels 12L, 12R, and a top panel 13. Support rails 14L, 14R are disposed on two levels supporting the left and right sides of the optical drives 3, which are stacked in two layers as described above. The lower support rails 14L, 14R are formed by bending the bottoms of the left and right side panels 12L, 12R to the inside. The upper support rails 14L, 14R are formed by cutting and bending the left and right side panels 12L, 12R to the inside. The difference in the height of the top support rails 14L, 14R and the bottom support rails 14L, 14R is set so that a specific space for venting heat can be assured between the top optical drive 3 and the bottom optical drive 3.

A locking lever 15 (locking member) and an unlocking lever 16 are disposed above each of the left support rails 14L. A pivot pin 17 extends up from a position toward the back end of each support rail 14L, and each locking lever 15 is attached freely pivotably to the corresponding pivot pin 17. An elongated hole 16a is formed extending in the front-back direction to the rear end part of the unlocking lever 16, and the pivot pin 17 passes therethrough. The unlocking lever 16 can thereby slide in the front-back direction along the side panel 12L.

Figure 4:
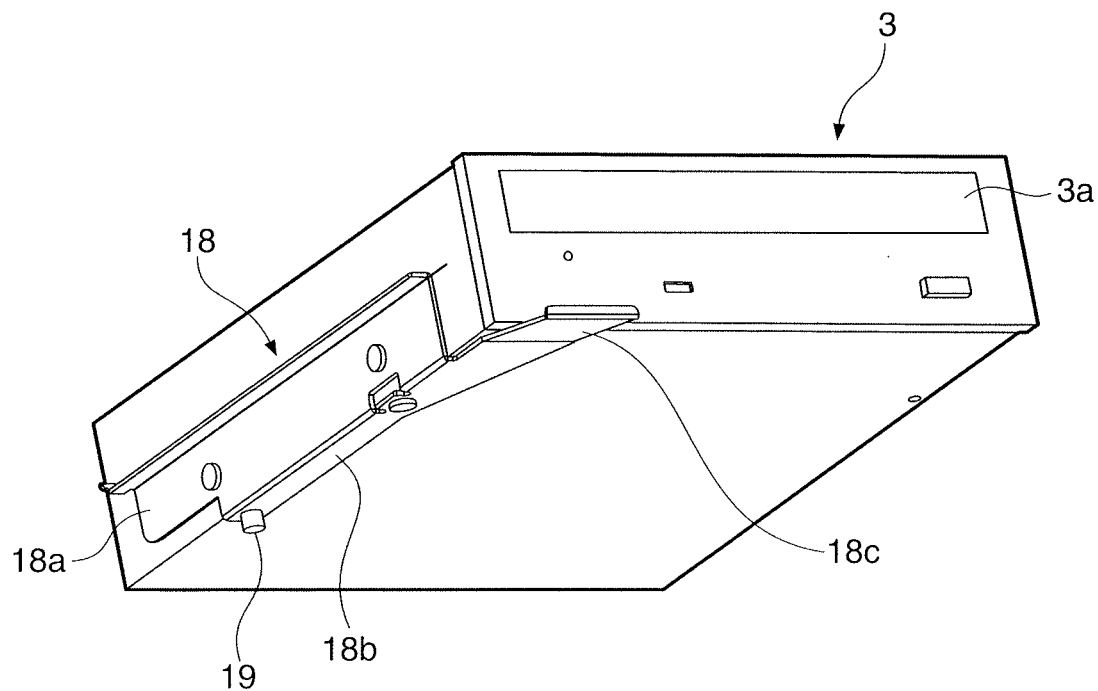
FIG. 4 is an oblique view of the optical drive from diagonally below.

FIG. 4 is an oblique view of the optical drive 3 from diagonally below. A locking panel 18 is affixed to the optical drive 3 at a position opposite the locking lever 15. The locking panel 18 has a side panel 18a that is affixed to the left side of the optical drive 3 housing, and a bottom panel 18b affixed to the left side bottom of the optical drive 3 housing. A locking pin 19 (engaging part) that protrudes down is formed at the back end of the bottom panel 18b. An operating tab 18c that protrudes to the front from the front of the optical drive 3 housing is formed at the front end of the bottom panel 18b. By pulling forward on the operating tab 18c when the lock is disengaged, the optical drive 3 can be pulled out to the front from inside the support frame 11.

FIG. 5 and FIG. 6 are bottom views of the optical drive installation mechanism 1A when seen from below, FIG. 5 showing when the optical drive 3 is locked, and FIG. 6 showing when the optical drive 3 is partially inserted to installation position P1 or P2. Note that the support rail 14L is omitted from FIG. 5 and FIG. 6, but the outline of the support rail 14L is indicated by a dotted line. Arrow A1 in FIG. 5 and FIG. 6 indicates the direction in which the optical drive 3 is inserted (insertion direction), and arrow A2 indicates the direction in which the optical drive 3 is removed (removal direction).

As shown in FIG. 5 and FIG. 6, the locking lever 15 is a flat, wedge-shaped member that becomes wider with proximity to the back of the support frame 11, and at the back end thereof has an engaging member 15a that protrudes to the optical drive 3 side. A torsion spring 20 (locking member pushing member) that pushes the locking lever 15 in the locking direction is disposed to the pivot pin 17 of the locking lever 15. As indicated by arrow B in FIG. 5, the direction in which the torsion spring 20 pushes (the locking direction) is the pivot direction causing the engaging member 15a to move to the optical drive 3 side.

When the optical drive 3 is inserted to installation position P1 or P2, the locking lever 15 is urged by the force of the torsion spring 20 so that the engaging member 15a moves significantly toward the inside of the support frame 11 as shown in FIG. 5. This position is the locked position 15A of the locking lever 15.

When the optical drive 3 is not installed in the support frame 11, the locking lever 15 is positioned as shown in FIG. 5 by the force of the torsion spring 20. When an optical drive 3 is then inserted to the support frame 11, the locking pin 19 disposed on the bottom of the optical drive 3 contacts the locking lever 15 from the front and pushes it to the back. As a result, the locking lever 15 pivots against the force of the torsion spring 20 and retreats to the side panel 12L side. More specifically, the locking lever 15 retracts from the locked position 15A in conjunction with insertion of the optical drive 3 so that the locking lever 15 does not interfere with inserting the optical drive 3.

When the optical drive 3 reaches the installation position P1 or P2, the locking pin 19 moves behind the back end of the locking lever 15. As a result, the locking lever 15 returns to the locked position 15A shown in FIG. 5, and the engaging member 15a protrudes in front of the locking pin 19 and engages the locking pin 19. The optical drive 3 is thus locked and cannot be removed. The locking lever 15, locking pin 19, and torsion spring 20 thus render the optical drive 3 lock mechanism 1B.

Figure 7:
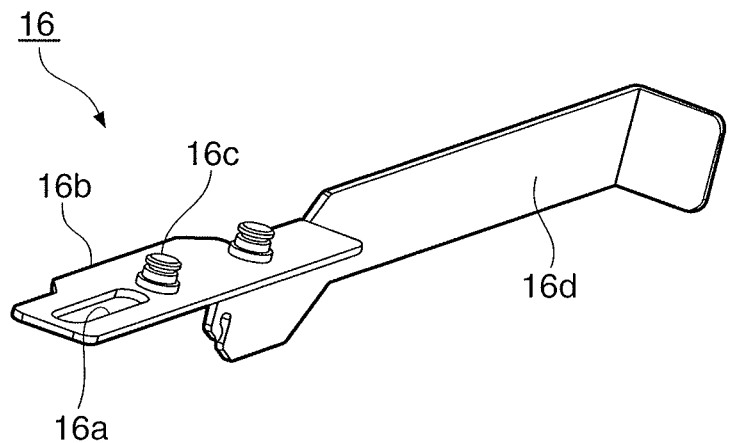
FIG. 7 is an oblique view of the lock release lever from diagonally below in the first embodiment of the invention

FIG. 7 is an oblique view of the unlocking lever 16 from diagonally below. A horizontal slide member 16b that slides along the top of the locking lever 15 is formed at the back end of the unlocking lever 16. The elongated hole 16a described above is formed at the back end of this slide member 16b, and an unlocking pin 16c that protrudes down is formed in front of the hole 16a. An unlocking operator 16d that extends to the front from the front end of the slide member 16b is formed at the front end part of the unlocking lever 16. When the optical drive 3 is installed to the installation position P1 or P2, the unlocking operator 16d protrudes to the front from the front of the optical drive 3 housing.

As shown in FIG. 5 and FIG. 6, a guide hole 15b is formed at the front end of the locking lever 15, and the unlocking pin 16c is inserted therein. As shown in FIG. 5, when the locking lever 15 is in the locked position 15A, the guide hole 15b is at an angle to the optical drive 3 insertion direction (the direction of arrow A1). The guide hole 15b is angled so that it approaches the side panel 12L with proximity to the front end of the locking lever 15, and separates from the side panel 12L with proximity to the back end.

FIG. 8 is a bottom view of the optical drive installation mechanism 1A when unlocked. If the unlocking lever 16 is pulled to the front (direction of arrow A2) when the optical drive 3 is locked as shown in FIG. 5, the unlocking pin 16c moves to the front inside the guide hole 15b. Because the guide hole 15b is angled to the direction in which the unlocking pin 16c moves as described above, linear movement of the unlocking lever 16 is converted to the pivoting action of the locking lever 15, and the locking lever 15 rotates against the urging force of the torsion spring 20 and moves to the unlocked position 15B. As a result, the engaging member 15a of the locking lever 15 retreats from in front of the locking pin 19, and the optical drive 3 can be pulled out to the front. The unlocking lever 16, the unlocking pin 16c formed thereon, and the guide hole 15b thus render the unlocking mechanism 1C.

As shown in FIG. 5, FIG. 6, and FIG. 8, a connector connecting mechanism 1D (pushing member) for connecting wires for data communication and power supply from a circuit board and power supply device inside the disc publisher 1 to the optical drive 3 is disposed behind the support frame 11. The connector connecting mechanism 1D includes a movable wiring connector 21 disposed to the end of the wiring cable (not shown in the figure) extending to a position behind the support frame 11; a holder 22 that supports the movable connector 21 movably in the front-back direction (the optical drive 3 insertion/removal direction); and a spring 23 that pushes the movable connector 21 toward the front. The holder 22 is disposed in a fixed position behind the support frame 11. The spring 23 is disposed so that it can expand and contract in the front-back direction inside the holder 22, and the front end of the spring 23 is connected to the back end of the movable connector 21.

A fixed connector 24 that removably connects to the movable connector 21 is disposed to the back end of the optical drive 3. When the optical drive 3 is inserted to the support frame 11, the fixed connector 24 is directly opposite the movable connector 21 located therebehind. When the optical drive 3 is removed from inside the support frame 11, the movable connector 21 is pushed forward to the outside position Q1 shown in FIG. 6 by the elastic restoring force of the spring 23. The range of movable connector 21 movement in the front-back direction is limited by the holder 22, and the forward position is the outside position Q1.

When the optical drive 3 is inserted to the support frame 11, the fixed connector 24 contacts the movable connector 21 at a specific position before the installation position P1, P2. Because the optical drive 3 is then pushed in against the elastic force of the spring 23, both connectors are pushed together in the connecting direction. When the optical drive 3 is inserted to the installation position P1, P2, the movable connector 21 is pushed back to the connected position Q2 to the back of the outside position Q1. Because the rear end of the range of movable connector 21 movement is set slightly behind the connected position Q2, the optical drive 3 is first pushed in past the installation position P1, P2 when the optical drive 3 is installed. As a result, the fixed connector 24 can be pushed against the movable connector 21 when the movable connector 21 is positioned to the rear end of the movable range, and both connectors can be reliably fit together.

When the optical drive 3 is then released after the fixed connector 24 and the movable connector 21 are connected, the optical drive 3 is returned to the front by the elastic restoring force of the spring 23 and is positioned with the locking pin 19 pressing against the locking lever 15 from the back. More specifically, when set to the installation position P1, P2, the optical drive 3 is pushed from the back to the front through both connectors by the elastic restoring force of the spring 23.

When the lock is disengaged as shown in FIG. 8 by operating the unlocking lever 16 as described above, the optical drive 3 is automatically pushed forward (direction of arrow A2). The range of movable connector 21 movement is limited by the holder 22 in this embodiment of the invention, and when the optical drive 3 is unlocked, the movable connector 21 is pushed to the outside position Q1 and stops while still connected to the fixed connector 24. More specifically, the distance the optical drive 3 is pushed when unlocked is the same as the distance the movable connector 21 moves from connected position Q2 to outside position Q1. More specifically, by suitably setting the range of movable connector 21 movement and the elastic restoring force of the spring 23, the distance the optical drive 3 is pushed when unlocked can be controlled to a desirable preset dimension.

A protruding part 25 that protrudes toward the left side panel is disposed to the support frame 11 at the back end of the right side panel 12R. The protruding part 25 is configured so that the distal end of the protruding part 25 contacts the right side of the optical drive 3 housing from the right as shown in FIG. 5 and FIG. 8 when the optical drive 3 is inserted to where the fixed connector 24 is directly opposite the movable connector 21.

The lock mechanism 1B is disposed only to the left side of the optical drive 3, and a lock mechanism 1B is not disposed to the right side. Pressure from the connector connecting mechanism 1D described above is applied to a position toward the right side of the back of the optical drive 3 where the fixed connector 24 is located. With this configuration, the pressure from the connector connecting mechanism 1D produces torque causing the optical drive 3 to pivot left (direction of arrow C in FIG. 5). However, by providing the protruding part 25 that contacts the back end of the optical drive 3 from the right side, rotation of the optical drive 3 to the left is limited, and the optical drive 3 can be held facing the front.

As described above, when the optical drive 3 is inserted to the installation position P1, P2 in this first embodiment of the invention, the force of the torsion spring 20 sets the lock mechanism 1B to the locked position, and the optical drive 3 cannot be pulled out. Installing the optical drive 3 is therefore completed by simply inserting the optical drive 3 all the way to the inside along the support frame 11. Installing the optical drive 3 is therefore simple.

Because the optical drive 3 is pushed in the removal direction by the connector connecting mechanism 1D in this first embodiment of the invention, the optical drive 3 is pushed as far forward as possible when locked, and the optical drive 3 is positioned with the locking pin 19 pushed against the locking lever 15. The optical drive 3 is thus reliably positioned to the installation position P1 or P2. Optical discs 10 can therefore be reliably transferred between the optical drives 3 and automatic loader 2, and optical disc 10 conveyance reliability is improved. When the optical drive 3 has not been inserted to the installation position P1, P2, the lock is not engaged, and the optical drive 3 is pushed out to the front from the support frame 11 by the force of the spring 23. Whether installation to the installation position P1, P2 was completed can therefore be confirmed by simply looking. The optical drive 3 is also automatically pushed to the front from inside the support frame 11 when the lock is disengaged by the unlocking mechanism 1C. The optical drive 3 can therefore be easily pulled out, and removal is simple.

In addition, because the lock mechanism 1B and unlocking mechanism 1C are provided only on the left side of the optical drive 3 in this first embodiment of the invention, the lock mechanism does not significantly block the vertical space between the optical drives 3, and space for venting heat can be assured. In addition, because a lock mechanism 1B is not provided on the right side, the elastic force of the spring 23 works in the direction causing the optical drive 3 to pivot around the locking position. However, rotation of the optical drive 3 at the installation position P1, P2 is prevented in this embodiment by providing the protruding part 25. The optical drive 3 can therefore be installed to a precise installation position.

Optical Drive Installation Mechanism

Embodiment 2

The optical drive installation mechanism 1A in the first embodiment described above has a lock mechanism 1B only on the left side of the optical drive 3, but the lock mechanism and unlocking mechanism can also be rendered as described below. An optical drive installation mechanism 30A according to a second embodiment of the invention is described below. The optical drive installation mechanism 30A of the second embodiment has a support frame 31 that is substantially identical to the support frame 11 of the first embodiment, and two optical drives 32 can be removably installed to the installation positions P1, P2 inside the support frame 31.

Figure 9:
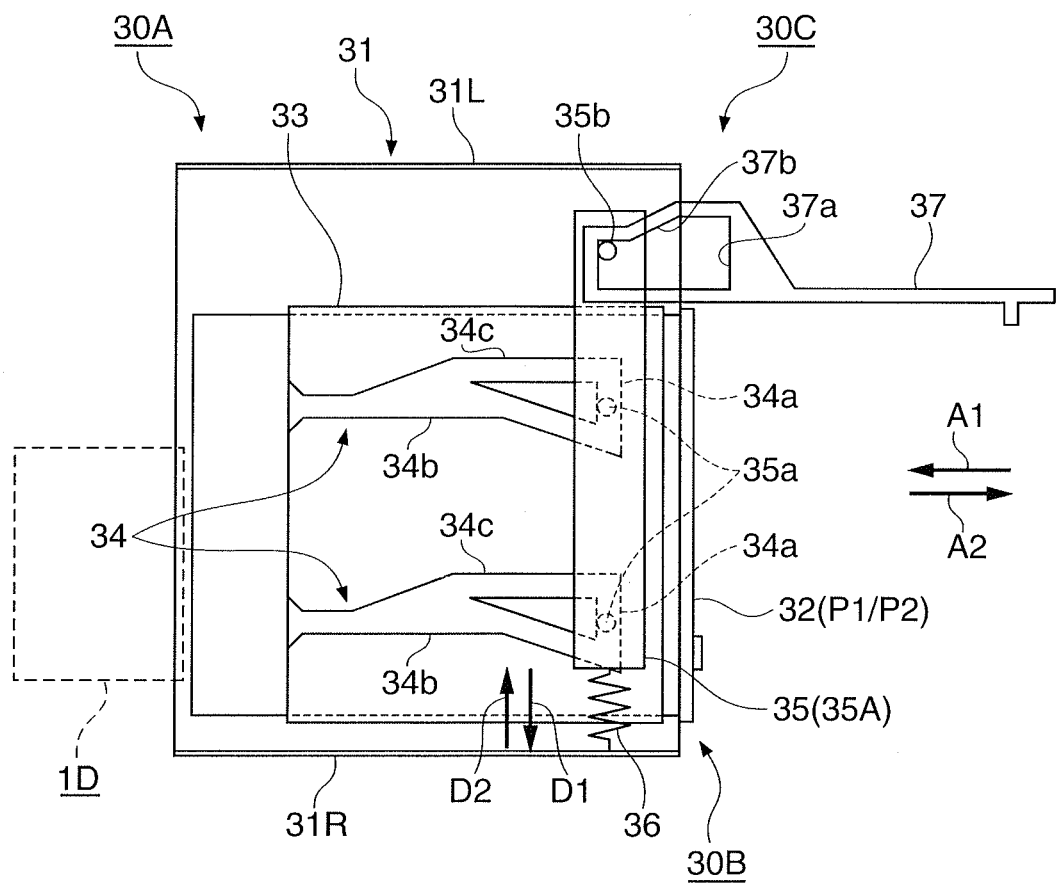
FIG. 9 is a bottom view showing main parts of the optical drive installation mechanism (when locked) according to the second embodiment of the invention.
Figure 10:
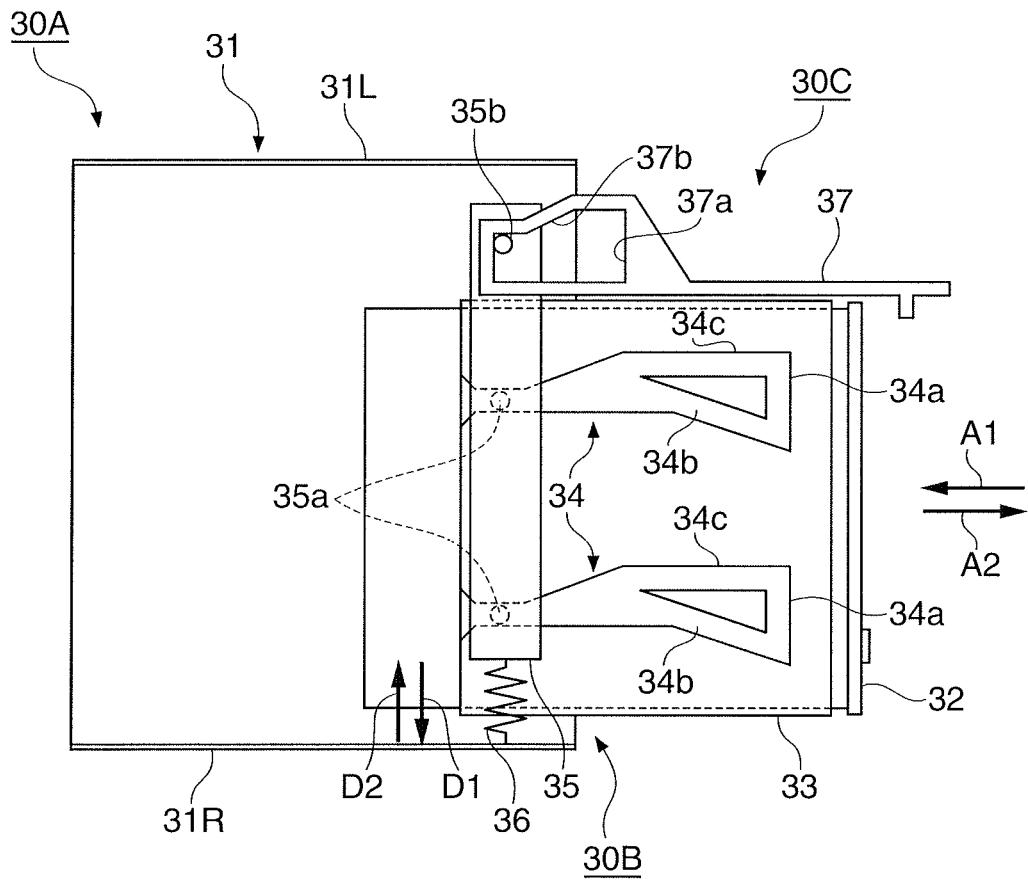
FIG. 10 is a bottom view showing main parts of the optical drive installation mechanism (when the optical drive is partially inserted) according to the second embodiment of the invention.
Figure 11:
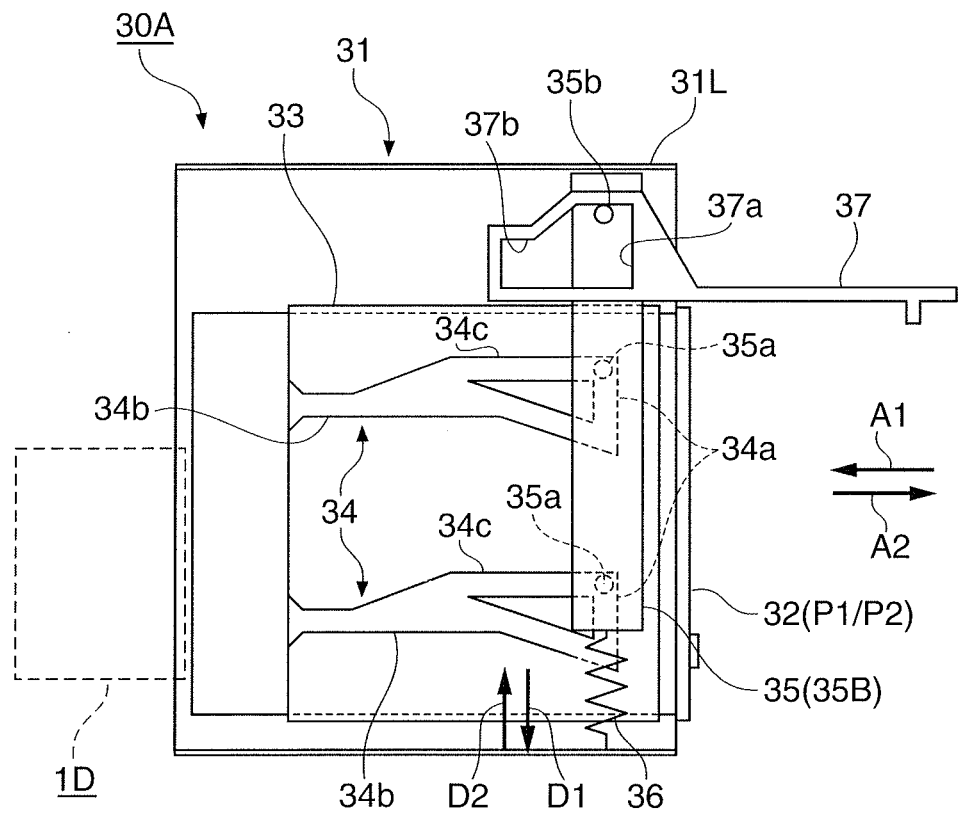
FIG. 11 is a bottom view showing main parts of the optical drive installation mechanism (when the lock is released) according to the second embodiment of the invention.

FIG. 9 to FIG. 11 are bottom views showing main parts of the optical drive installation mechanism 30A according to the second embodiment of the invention from below, FIG. 9 showing when the optical drive 32 is locked, FIG. 10 showing when the optical drive 32 is partially inserted to the installation position P1 or P2, and FIG. 11 showing when the lock is disengaged. An optical drive 32 can be removably installed in the support frame 31 with the left and right sides supported by left and right support rails (not shown in the figure) disposed to the support frame 31 in the same way as in the support frame 11 according to the first embodiment.

The optical drive 32 according to the second embodiment of the invention has a lock panel 33 (support member) attached to the bottom. Identically shaped, left and right engagement channels 34 are formed at two places on the lock panel 33. Each engagement channel 34 has a first engagement channel 34a (engaging part) extending widthwise to the optical drive 32 at a position toward the front of the lock panel 33, and a second engagement channel 34b extending to the back from one end of the first engagement channel 34a. The second engagement channel 34b is shaped with the front end inclined at an acute angle to the first engagement channel 34a, and the back end extending perpendicularly to the first engagement channel 34a (that is, the insertion direction of the optical drive 32). The engagement channel 34 also has a return channel 34c that extends to the back from the other end of the first engagement channel 34a, and connects to the middle of the second engagement channel 34b.

A slide plate 35 (locking member) is disposed to a position opposing the bottom lock panel 33 from below when the optical drive 32 is inserted to the installation position P1, P2. Two slide pins 35a that engage the engagement channels 34 of the lock panel 33 are disposed to the top of the slide plate 35. The slide plate 35 is supported on the support frame 31 by a slide mechanism not shown slidably in the direction perpendicular to the insertion direction of the optical drive 32 (the direction of arrows D1, D2 in FIG. 9). An unlocking pin 35b is formed on one end of the slide plate 35. A spring 36 that pushes the slide plate 35 in the sliding direction is disposed to the other end of the slide plate 35. The spring 36 is disposed between the side panel 31R on the right side and the right end of the slide plate 35, and pushes the slide plate 35 toward the left side panel 31L of the support frame 31 (the direction of arrow D2).

When starting to insert the optical drive 32 toward installation position P1 or P2, the slide pins 35a enter the second engagement channels 34b from the back end as shown in FIG. 10. The slide pins 35a then move through the inside of the second engagement channels 34b as the optical drive 32 is inserted. Because the middle of the second engagement channels 34b extend at an angle, when the slide pins 35a pass this part the slide plate 35 moves to the side of the right side panel 31R of the support frame 31 (direction of arrow D1 in FIG. 10) in opposition to the force of the spring 36.

The unlocking lever 37 described below remains pulled out to the front as shown in FIG. 9 and FIG. 10 when inserting the optical drive 32. As a result, the unlocking pin 35b of the slide plate 35 enters the narrowed part at the back end of the guide hole 37a described below, and the slide plate 35 cannot move further to the left side (the direction of arrow D2) from the positions shown in FIG. 9 and FIG. 10. As a result, the slide pins 35a cannot enter the return channels 34c from the middle of the second engagement channels 34b when inserting the optical drive 32, and proceed toward the front ends of the second engagement channels 34b.

When the optical drive 32 reaches the installation position P1 or P2, the slide pins 35a reach the front end of the second engagement channels 34b. As a result, the slide pins 35a can enter the first engagement channels 34a. Because the slide plate 35 is pushed by the spring 36, the slide plate 35 moves in the direction the spring 36 pushes (direction of arrow D2) as shown in FIG. 9, and the slide pins 35a advance to the middle of the first engagement channels 34a. This position is the locked position 35A of the slide plate 35.

In the locked position 35A, the first engagement channels 34a engaged by the slide pins 35a extend in a direction perpendicular to the insertion direction of the optical drive 32. When the slide pins 35a are thus engaged in the first engagement channels 34a, the optical drive 32 cannot be moved in the removal direction (direction of arrow A2) for removal from the installation position P1, P2. More specifically, the engagement channel 34, slide plate 35, and spring 36 render the optical drive 32 lock mechanism 30B in this embodiment of the invention.

The optical drive installation mechanism 30A also has an unlocking mechanism 30C for disengaging the locked state of the lock mechanism 30B. This unlocking mechanism 30C includes the unlocking pin 35b disposed to the slide plate 35 described above, and the unlocking lever 37 in which the guide hole 37a that guides the unlocking pin 35b is formed. The guide hole 37a is formed in the back end part of the unlocking lever 37, and the front end of the unlocking lever 37 extends in front of the support frame 31.

As shown in FIG. 9, when the slide plate 35 is in the locked position 35A, the unlocking pin 35b is pressed to the inside wall 37b of the guide hole 37a by the force of the spring 36 applied to the slide plate 35. The guide hole 37a is narrow at the back end and wide at the front end, and the back end of the inside wall 37b is close to the optical drive 32 and the front end is separated from the optical drive 32. As a result, when the guide hole 37a is moved in the front-back direction relative to the unlocking pin 35b, the slide plate 35 moves in the direction that the spring 36 pushes or the opposite direction.

When the optical drive 32 is locked as shown in FIG. 9 and the unlocking lever 37 is pushed in toward the back (the direction of arrow A1), the unlocking pin 35b moves along the inside wall 37b to the front inside the guide hole 37a. Because the inside wall 37b is stepped as described above, the slide plate 35 slides in the direction pushed by the spring 36 (direction of arrow D2), and moves to the unlocked position 35B shown in FIG. 11. In the unlocked position 35B, the slide pins 35a move to the junction with the return channels 34c. As a result, the slide pins 35a return through the return channels 34c to the second engagement channels 34b, and the optical drive 32 can be pulled out.

As in the first embodiment, a connector connecting mechanism 1D is disposed behind the optical drive 32 in this second embodiment as shown in FIG. 9 and FIG. 11. Therefore, when the slide plate 35 is moved to the unlocked position 35B by operating the unlocking lever 37, and engagement of the slide pins 35a and first engagement channels 34a is released, the pushing force of the connector connecting mechanism 1D pushes the optical drive 32 forward (direction of arrow A2).

As in the first embodiment, the lock mechanism 1B is engaged when an optical drive 32 is inserted to the installation position P1 or P2 in the second embodiment thus comprised. The optical drive 32 can thus be easily installed. In addition, because the optical drive 32 is pushed forward as far as possible by the connector connecting mechanism 1D when locked, the optical drive 32 is reliably positioned to the installation position P1, P2. The optical drive 32 is also pushed forward when the optical drive 32 is not inserted all the way to the installation position P1, P2 and when the lock is released by the unlocking mechanism 30C. Whether installation to the installation position P1, P2 was completed can therefore be determined at a glance, and removing the optical drive 32 is also simple.

Other Embodiments

The first and second embodiments described above apply the invention to a disc publisher 1 for writing data continuously to multiple optical discs 10, but the invention can also be applied to any optical disc processing device in which an optical drive can be removably installed and which has an optical disc conveyance mechanism.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2011-140624, filed Jun. 24, 2011 is expressly incorporated by reference herein.

What is claimed is:

1. An optical drive installation device, comprising:
a support frame configured to support a removable optical drive at an installation position;
a lock mechanism that has a locking member moveable between (i) a locked position preventing the optical drive from being removed from the installation position, and (ii) an unlocked position not interfering with the optical drive being removed from the installation position;
an unlocking mechanism configured to release the locking member of the lock mechanism from the locked position;
a pushing member configured to push the optical drive in a direction in which the optical drive is to be removed from the installation position; and
a locking member pushing member configured to push the locking member toward the locked position;
wherein
the locking member is configured to
retract from the locked position when installing the optical drive to the installation position, and
move to the locked position by a pressure of the locking member pushing member when the optical drive is installed at the installation position;
the locking member is engageable with a locking pin disposed on the optical drive when the optical drive is installed at the installation position;
the locking member is a locking lever supported on the support frame; and
the locking member pushing member is configured to push the locking lever in a direction pivoting
from the unlocked position where the locking lever is retracted from a path of movement of the optical drive to and from the installation position,
to the locked position where the locking lever is in the path of movement.

2. The optical drive installation device of claim 1, wherein:
the locking lever is configured to
be pushed by the locking pin and pivot toward the unlocked position when installing the optical drive, and
move to the locked position when the optical drive is at the installation position.

3. The optical drive installation device of claim 1, wherein:
the unlocking mechanism includes:
a guide hole formed in the locking lever, and
an unlocking lever having an unlocking pin engaged in the guide hole to cause the locking lever to rotate toward the unlocked position when the unlocking lever is operated.

4. The optical drive installation device of claim 1, wherein: the optical drive has a first side, and a second side opposite the first side;
the support frame has a first part and a second part configured to face the first side and the second side of the optical drive, respectively;
the locking pin is disposed at the first side of the optical drive;
the locking lever is disposed at the first part of the support frame; and
the support frame has, at the second part, a protruding part configured to contact the second side of the optical drive.

5. An optical drive installation device, comprising:
a support frame configured to support a removable optical drive at an installation position;
a lock mechanism that has a locking member moveable between (i) a locked position preventing the optical drive from being removed from the installation position, and (ii) an unlocked position not interfering with the optical drive being removed from the installation position;
an unlocking mechanism configured to release the locking member of the lock mechanism from the locked position;
a pushing member configured to push the optical drive in the direction in which the optical drive is removed from the installation position;
a locking member pushing member configured to push the locking member toward the locked position; and
a support member configured to support the optical drive;
wherein
the lock mechanism further has an engaging part engageable with the locking member;
the engaging part is disposed at one of the optical drive and the support frame, and the locking member is disposed at the other of the optical drive and the support frame;
the locking member is configured to
retract from the locked position when installing the optical drive to the installation position, and
move to the locked position by a pressure of the locking member pushing member when the optical drive is installed at the installation position;
the engaging part is formed in the support member, and includes
a first engaging channel formed in a first direction intersecting a second direction in which the optical drive is to be installed, and
a second engaging channel formed in the second direction and connected to the first engaging channel; and
the locking member is a slide panel supported by the support frame,
having a slide pin that engages the first engaging channel and second engaging channel, and
slidable in the first direction.

6. The optical drive installation device of claim 5, wherein:
when the optical drive is being installed, the slide pin is configured to move in the second engaging channel to the junction between the first engaging channel and second engaging channel; and
when the optical drive is at the installation position, the slide pin is configured to move into the first engaging channel due to the pressure of the locking member pushing member, and the optical drive is held in the locked position.

7. An optical disc processing device, comprising:
a removable optical drive configured to process an optical disc; and
an optical drive installation unit including
a support frame configured to support the optical drive at an installation position, a lock mechanism that has a locking member moveable between (i) a locked position preventing the optical drive from being removed from the installation position and (ii) an unlocked position not interfering with the optical drive being removed from the installation position, an unlocking mechanism configured to release the lock mechanism from the locked position, a pushing member configured to push the optical drive in a direction in which the optical drive is to be removed from the installation position; and a locking member pushing member configured to push the locking member toward the locked position;

wherein the locking member is configured to
retract from the locked position when installing the optical drive to the installation position, and
move to the locked position by a pressure of the locking member pushing member when the optical drive is installed at the installation position;

the locking member is engageable with a locking pin disposed on the optical drive when the optical drive is installed at the installation position;

the locking member is a locking lever supported on the support frame; and the locking member pushing member is configured to push the locking lever in a direction pivoting
from the unlocked position where the locking lever is retracted from a path of movement of the optical drive to and from the installation position,
to the locked position where the locking lever is in the path of movement.

8. The optical disc processing device of claim 7, wherein:
the locking lever is configured to
be pushed by the locking pin and pivot toward the unlocked position when installing the optical drive, and
move to the locked position when the optical drive is at the installation position.

9. The optical disc processing device of claim 7, wherein:
the unlocking mechanism includes:
a guide hole formed in the locking lever, and
an unlocking lever having an unlocking pin engaged in the guide hole to cause the locking lever to rotate toward the unlocked position when the unlocking lever is operated.

10. The optical disc processing device of claim 7, wherein:
the optical drive has a first side, and a second side opposite the first side;
the support frame has a first part and a second part configured to face the first side and the second side of the optical drive, respectively;
the locking pin is disposed at the first side of the optical drive;
the locking lever is disposed at the first part of the support frame; and
the support frame has, at the second part, a protruding part configured to contact the second side of the optical drive.

11. An optical disc processing device, comprising:
a removable optical drive configured to process an optical disc; and
an optical drive installation unit including
a support frame configured to support a removable optical drive at an installation position;
a lock mechanism that has a locking member moveable between (i) a locked position preventing the optical drive from being removed from the installation position, and (ii) an unlocked position not interfering with the optical drive being removed from the installation position;
an unlocking mechanism configured to release the locking member of the lock mechanism from the locked position;
a pushing member configured to push the optical drive in the direction in which the optical drive is removed from the installation position;
a locking member pushing member configured to push the locking member toward the locked position; and
a support member configured to support the optical drive;

wherein the lock mechanism further has an engaging part engageable with the locking member;
the engaging part is disposed at one of the optical drive and the support frame, and the locking member is disposed at the other of the optical drive and the support frame;
the locking member is configured to
retract from the locked position when installing the optical drive to the installation position, and
move to the locked position by a pressure of the locking member pushing member when the optical drive is installed at the installation position;
the engaging part is formed in the support member, and includes
a first engaging channel formed in a first direction intersecting a second direction in which the optical drive is to be installed, and
a second engaging channel formed in the second direction and connected to the first engaging channel; and
the locking member is a slide panel
supported by the support frame,
having a slide pin that engages the first engaging channel and second engaging channel, and
slidable in the first direction.

12. The optical disc processing device of claim 11, wherein:
when the optical drive is being installed, the slide pin is configured to move in the second engaging channel to the junction between the first engaging channel and second engaging channel; and
when the optical drive is at the installation position, the slide pin is configured to move into the first engaging channel due to the pressure of the locking member pushing member, and the optical drive is held in the locked position.

* * * * *